(12) United States Patent
Nakamachi

(10) Patent No.: US 6,355,738 B2
(45) Date of Patent: Mar. 12, 2002

(54) POLYESTER AND PROCESS FOR PREPARING POLYESTER

(75) Inventor: Koji Nakamachi, Waki-cho (JP)

(73) Assignee: Mitsui Chemicals INC, Tokyo (JP)

(*) Notice: Subject to any disclaimer, the term of this patent is extended or adjusted under 35 U.S.C. 154(b) by 0 days.

(21) Appl. No.: 09/258,079

(22) Filed: Feb. 26, 1999

(30) Foreign Application Priority Data

Feb. 27, 1998 (JP) ............................................. 10-046684

(51) Int. Cl.⁷ .......................... C08F 20/00; C08G 63/02
(52) U.S. Cl. ...................... 525/444; 525/437; 528/272; 528/298; 528/300; 528/301; 528/302; 528/308; 528/308.6
(58) Field of Search ................................. 525/437, 444; 528/272, 298, 300, 302, 301, 308, 308.6

(56) References Cited

U.S. PATENT DOCUMENTS 5,006,613 A   4/1991   Shepherd et al.
5,902,539 A   5/1999   Schmidt et al.

FOREIGN PATENT DOCUMENTS

| EP | 0174265 | 3/1986 |
| EP | 0415728 | 8/1990 |
| EP | 0822213 | 2/1998 |
| JP | 2274757 | 11/1990 |
| JP | 8034910 | 2/1996 |
| JP | 9124785 | 5/1997 |

*Primary Examiner*—Samuel A. Acquah

(57) ABSTRACT

A process for preparing a polyester comprising the steps of blending (A) polyethylene terephthalate before solid phase polymerization having an intrinsic viscosity of 0.3 to 0.8 dl/g in an amount of 40 to 99% by weight, with (B) polyethylene naphthalate before solid phase polymerization having an intrinsic viscosity of 0.3 to 0.7 dl/g in an amount of 1 to 60% by weight, and subjecting the blend to solid phase polymerization. The process of the invention can provide a polyester having excellent gas barrier properties, transparency and heat resistance and hardly generating acetaldehyde.

21 Claims, No Drawings

POLYESTER AND PROCESS FOR PREPARING POLYESTER

FIELD OF THE INVENTION

The present invention relates to a novel polyester and to a process for preparing a polyester. More particularly, the invention relates to a novel polyester having excellent gas barrier properties, transparency and heat resistance and hardly generate acetaldehyde and to a process for preparing such a polyester.

BACKGROUND OF THE INVENTION

Because of their excellent gas barrier properties, transparency and mechanical strength, saturated polyesters such as polyethylene terephthalate are widely used for containers such as bottles. Particularly, the bottles obtained by biaxial stretching blow molding (draw blow molding) of polyethylene terephthalate are excellent in transparency, mechanical strength, heat resistance and gas barrier properties, so that they have been extensively used as containers (PET bottles) to be filled with drinks such as juice, soft drinks and carbonated beverages.

Such bottles are generally produced by a process comprising molding a saturated polyester into a preform having a neck part and a body part, inserting the preform in a mold of given shape, and subjecting the preform to stretching blow molding to stretch the body part, thereby producing a bottle having a neck part and a stretched body part.

The polyester bottles, particularly polyester bottles for drinks such as juice, are required to have heat resistance high enough for heat sterilization of the contents therein, and therefore the bottles are generally further subjected to heat treatment (heat setting) after the blow molding to improve the heat resistance.

In the polyester bottles obtained by the above process, however, the neck parts are unstretched and inferior to the stretched body parts in the mechanical strength and the heat resistance. In general, therefore, the neck parts of the preforms are heated to crystallize prior to the blow molding, or the neck parts of the bottles obtained by blow molding are heated to crystallize, thereby improving the neck parts in the mechanical strength and the heat resistance.

In recent years, the sizes of bottles produced from the polyester resins (particularly polyethylene terephthalate) tend to be made smaller. In case of such small-sized bottles, the contact area between the contents and the bottle body part per unit volume is increased, and thus loss of gas or permeation of oxygen from the outside may have a bad influence on the contents, resulting in decrease of shelf life of the contents. Accordingly, the polyester resins are required to have more excellent gas barrier properties than before.

In order to improve the heat resistance and the gas barrier properties of the polyester resins, an attempt to blend polyethylene terephthalate with polyethylene naphthalate has been proposed (see Japanese Patent Laid-Open Publication No. 34910/1996). The blend of polyethylene terephthalate and polyethylene naphthalate, however, generates acetaldehyde when it is melt kneaded at a high temperature to improve compatibility, and this causes problems such as change of taste of the contents filled in the container and lowering of transparency.

There has been also proposed a polyester composition comprising ethylene glycol and a dicarboxylic acid component which comprises terephthalic acid as a major ingredient and naphthalenedicarboxylic acid. This polyester composition, however, does not always have sufficient gas barrier properties and sometimes generates acetaldehyde. Accordingly, development of a polyester composition having more excellent gas barrier properties and hardly generating acetaldehyde is desired.

OBJECT OF THE INVENTION

The present invention has been made with a view to solve such problems in the prior art as mentioned above, and it is an object of the invention to provide a polyester having excellent gas barrier properties, transparency and heat resistance and hardly generating acetaldehyde and to provide a process for preparing such a polyester.

SUMMARY OF THE INVENTION

The polyester according to the present invention is a polyester which comprises dicarboxylic acid constituent units derived from terephthalic acid and naphthalenedicarboxylic acid and diol constituent units derived from ethylene glycol, and which has the following properties:

constituent units derived from terephthalic acid are 40 to 99.5% by weight, constituent units derived from naphthalenedicarboxylic acid are 0.5 to 60% by weight and constituent units derived from isophthalic acid are 0 to 25% by weight, all based on the total amount of dicarboxylic acid constituent units (i), constituent units derived from ethylene glycol are 95 to 100% by weight and constituent units derived from a polyalkylene glycol having an alkylene oxide chain of 2 to 10 carbon atoms are 0 to 5% by weight, both based on the total amount of diol constituent units (ii), the intrinsic viscosity is in the range of 0.5 to 1.5 dl/g, the melting point (Tm (° C.)), as measured by a differential scanning calorimeter, satisfies the following formula (I):

$$[1/527-0.0017 \cdot \ln(1-(m_I+m_N)/200)]^{-1}-273 < Tm \leq 254 \quad (I)$$

wherein $m_I$ is a proportion (% by mol) of the constituent units derived from isophthalic acid to all of the dicarboxylic acid constituent units, and $m_N$ is a proportion (% by mol) of the constituent units derived from naphthalenedicarboxylic acid to all of the dicarboxylic acid constituent units, and the amount of constituent units having a sequence of naphthalenedicarboxylic acid-ethylene glycol-terephthalic acid ($L_{NET}$ (% by mol)), measured by $^1$H-NMR, satisfies the following formula (II):

$$L_{NET} \geq 0.5 \times m_N \quad (II)$$

wherein $m_N$ is a proportion (% by mol) of the constituent units derived from naphthalenedicarboxylic acid to all of the dicarboxylic acid constituent units.

The process for preparing a polyester according to the present invention comprises blending (A) polyethylene terephthalate before solid phase polymerization having an intrinsic viscosity of 0.3 to 0.8 dl/g in an amount of 99 to 40% by weight, with (B) polyethylene naphthalate before solid phase polymerization having an intrinsic viscosity of 0.3 to 0.7 dl/g in an amount of 1 to 60% by weight, and subjecting the blend to solid phase polymerization.

The polyethylene naphthalate (B) preferably comprises (i) dicarboxylic acid constituent units comprising 100 to 55% by weight of naphthalenedicarboxylic acid constituent units and 0 to 45% by weight of isophthalic acid constituent unites, and (ii) diol constituent units comprising 100 to 90% by weight of ethylene glycol constituent units and 0 to 10% by weight of polyalkylene glycol constituent units having an alkylene oxide chain of 2 to 10 carbon atoms.

The diol constituent units preferably comprises 99.999 to 90% by weight of ethylene glycol constituent units and 0.001 to 10% by weight of polyalkylene glycol constituent units having an alkylene oxide chain of 2 to 10 carbon atoms.

The polyalkylene glycol preferably has a degree of polymerization (n) of 5 to 50, and is particularly preferably polytetramethylene glycol.

In the present invention, it is preferable that the blend is heated to precrystallize it prior to the solid phase polymerization, and it is particularly preferable that the blend to be subjected to the solid phase polymerization has a heat-up crystallizing temperature of not higher than 190° C.

DETAILED DESCRIPTION OF THE INVENTION

The novel polyesters and the process for preparing a polyester according to the invention are described in detail hereinafter.

Novel Polyester

The novel polyester according to the present invention comprises dicarboxylic acid constituent units derived from terephthalic acid, naphthalenedicarboxylic acid and optionally isophthalic acid, and diol constituent units derived from ethylene glycol and optionally a polyalkylene glycol having an alkylene oxide chain of 2 to 10 carbon atoms.

In the polyester, the dicarboxylic acid constituent units comprise constituent units derived from terephthalic acid in amounts of 40 to 99.5% by weight, preferably 50 to 95% by weight; constituent units derived from naphthalenedicarboxylic acid in amounts of 0.5 to 60% by weight, preferably 5 to 50% by weight; and constituent units derived from isophthalic acid in amounts of 0 to 25% by weight, all based on the total amount of dicarboxylic acid constituent units. Although the constituent units derived from isophthalic acid may not be present, it is desirable that these constituent units are preferably present in amount of 0.5 to 20% by weight.

The polyester may contain constituent units derived from dicarboxylic acids other than the terephthalic acid, naphthalenedicarboxylic acid and isophthalic acid in amounts, for example not more than 15% by weight, within limits not prejudicial to the object of the invention.

Examples of other dicarboxylic acids include:

aromatic dicarboxylic acids, such as phthalic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

It is desirable that the diol constituent units comprise constituent units derived from ethylene glycol in amounts of 95 to 100% by weight, preferably 95 to 99.999% by weight, more preferably 96 to 99.99% by weight, and constituent units derived from a polyalkylene glycol having an alkylene oxide chain of 2 to 10 carbon atoms in amounts of 0 to 5% by weight, preferably 0.001 to 5% by weight, more preferably 0.01 to 4% by weight, both based on the total amount of diol constituent units.

Although the polyester of the invention may not contain the polyalkylene glycol constituent units, it is desirable that these units are present in the aforementioned range, with regard to gas barrier properties, heat-up crystallizing rate, transparency and heat stability in molding processes.

The polyalkylene glycol having an alkylene oxide chain of 2 to 10 carbon atoms is a conventionally known polyalkylene glycol, and can be prepared by condensing an alkylene glycol of 2 to 10 carbon atoms in accordance with a known method.

The polyalkylene glycol desirably has a degree of polymerization (n) of 5 to 50, preferably 10 to 45.

Examples of the polyalkylene glycols include polyethylene glycol, polypropylene glycol, polytetramethylene glycol, polyheptamethylene glycol, polyhexamethylene glycol and polyoctamethylene glycol. Of these, preferable are polypropylene glycol, polytetramethylene glycol, polyhexamethylene glycol and polyoctamethylene glycol, because they contribute to improvement of gas barrier properties. Particularly preferable is polytetramethylene glycol.

The polyester may further contain constituent units derived from diols other than the ethylene glycol and the polyalkylene glycol in amounts, for example not more than 15% by weight, within limits not prejudicial to the object of the invention.

Examples of other diols include:

aliphatic glycols, such as diethylene glycol, triethylene glycol, tetraethylene glycol, propylene glycol, butanediol, pentanediol, neopentyl glycol, hexamethylene glycol and dodecamethylene glycol;

alicyclic diols, such as cyclohexanedimethanol;

glycols containing aromatic groups, such as 1,3-bis(2-hydroxyethoxy)benzene, 1,2-bis(2-hydroxyethoxy)benzene and 1,4-bis(2-hydroxyethoxy)benzene; and aromatic diols, such as bisphenols, hydroquinone and 2,2-bis(4-β-hydroxyethoxyphenyl)propane.

These diols may be used in combination two or more kinds. Of these diols, preferable are diethylene glycol and cyclohexanedimethanol.

The polyester may further contain constituent units derived from polycarboxylic acids having 3 or more carboxyl groups and polyhydric alcohols having 3 or more hydroxyl groups, within limits not prejudicial to the object of the invention. Examples of polycarboxylic acids are trimeric acid and pyromellitic anhydride, and examples of polyhydric alcohols are glycerol, 1,1,1-trimethylolethane, 1,1,1-trimethylolpropane, 1,1,1-trimethylolmethane and pentaerythritol.

The novel polyester according to the present invention desirably has an intrinsic viscosity (η), as measured in o-chlorophenol at 25° C., of 0.5 to 1.5 dl/g, preferably 0.6 to 1.2 dl/g.

In the novel polyester, the melting point (Tm (° C.)), as measured by a differential scanning calorimeter, satisfies the following formula (I):

$$[1/527-0.0017 \cdot \ln(1-(m_I+m_N)/200)]^{-1}-273 < Tm \leq 254 \quad (I)$$

wherein $m_I$ is a proportion (% by mol) of the constituent units derived from isophthalic acid to all of the dicarboxylic acid constituent units, and in is a proportion (% by mol) of the constituent units derived from naphthalenedicarboxylic acid to all of the dicarboxylic acid constituent units.

The melting point (Tm (° C.)) preferably satisfies the following formula (I'):

$$[1/527 - 0.0017 \cdot \ln(1-(m_I+m_N)/200)]^{-1} - 270 < Tm \leq 254 \quad (I')$$

In the novel polyester, the amount of constituent units having a sequence of naphthalenedicarboxylic acid-ethylene glycol-terephthalic acid ($L_{NET}$ (% by mol)), as measured by $^1$H-NMR, satisfies the following formula (II):

$$L_{NET} \geq 0.5 \times m_N \quad (II)$$

wherein $m_N$ is a proportion (% by mol) of the constituent units derived from naphthalenedicarboxylic acid to all of the dicarboxylic acid constituent units.

In the formula (II), $L_{NET}$ is preferably $L_{NET} \geq 0.55 \times m_N$, more preferably $1.8 \times m_N \geq L_{NET} \geq 0.6 \times m_N$.

The amount of constituent units having a sequence of naphthalenedicarboxylic acid-ethylene glycol-terephthalic acid ($L_{NET}$) is determined as follows:

The measurement is carried out using a FT-NMR measuring machine (manufactured by Nippon Electronics Co., NMRJMN-GX270 model) for a solution of the polyester of the invention or a molded product thereof dissolved in deuterochloroform.

There are depicted on the chart (1) a peak based on constituent units having a sequence of terephthalic acid (or isophthalic acid)-ethylene glycol-terephthalic acid (or isophthalic acid), (2) a peak based on constituent units having a sequence of naphthalenedicarboxylic acid-ethylene glycol-naphthalenedicarboxylic acid, and (3) a peak based on constituent units having a sequence of naphthalenedicarboxylic acid-ethylene glycol-terephthalic acid. Each of peak areas are measured and the amount of constituent units having a sequence of naphthalenedicarboxylic acid-ethylene glycol-terephthalic acid ($L_{NET}$) is calculated as a ratio between these peak areas.

It is desirable that the polyester has a haze value, as measured for a 5 mm-thick square plate obtained by injection molding at an injection molding temperature of 280° C. and a mold temperature of 10° C., of not more than 20%, preferably not more than 18%.

The polyester of the invention desirably has an acetaldehyde content of not more than 20 ppm, preferably not more than 18 ppm.

The polyester of the invention can be prepared by the later-described process.

The polyester of the invention may optionally contain additives commonly added to polyesters, such as colorants, antioxidants, oxygen absorbents, ultraviolet light absorbers, antistatic agents and flame retardants. In the polyester, recycled PET may arbitrarily blended. The polyester may furthermore contain resins other than polyesters, such as polyethylene, ionomers, polypropylene and polyester elastomers, if desired.

The polyester of the invention can be used as a material of various molded products such as preforms, bottles, (oriented) films and sheets, after pelletizing it to polyester pellets and blending the pellets with another resin and an additive, if desired. These molded products bay be laminated ones having at least one layer formed from the polyester of the invention or having at least one layer formed from a blend of the polyester of the invention and another resin. This layer may be any of inner, outer and intermediate layers.

Examples of resins for forming other layers include polyesters, such as polyethylene terephthalate and polyethylene isophthalate; polyamides, such as nylon 6 and ethylene/vinyl acetate copolymers. Of these, polyethylene terephthalate is particularly preferable.

Bottles produced from the polyester as described above are excellent in gas barrier properties, transparency and heat resistance. Moreover, the bottles hardly generate acetaldehyde, so that the taste of the contents such as juice does not deteriorate.

Next, the process for preparing a polyester according to the present invention is described.

Process for Preparing Polyester

The process for preparing a polyester according to the invention comprises blending (A) polyethylene terephthalate before solid phase polymerization having an intrinsic viscosity of 0.3 to 0.8 dl/g in an amount of 99 to 40% by weight, with (B) polyethylene naphthalate before solid phase polymerization having an intrinsic viscosity of 0.3 to 0.7 dl/g in an amount of 1 to 60% by weight, and subjecting the blend to solid phase polymerization.

(A) Polyethylene Terephthalate

The polyethylene terephthalate for use in the invention comprises dicarboxylic acid units derived from terephthalic acid or its ester derivative and diol units derived from ethylene glycol or its ester derivative.

The dicarboxylic acid units of the polyethylene terephthalate (A) contain terephthalic acid units in amounts of not less than 80% by mol, preferably 85 to 100% by mol, based on 100% by mol of the dicarboxylic acid units.

Examples of other dicarboxylic acids which may be contained in amounts of not more than 20% by mol include:

aromatic dicarboxylic acids, such as phthalic acid (orthophthalic acid), isophthalic acid, 2,6-naphthalenedicarboxylic acid, 2,7-naphthalenedicarboxylic acid, 2,5-naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of these dicarboxylic acids, and these dicarboxylic acids or their ester derivatives can be used in combination of two or more kinds.

Of these dicarboxylic acids, preferable is isophthalic acid.

The diol units of the polyethylene terephthalate (A) desirably contain ethylene glycol units in amounts of not less than 80% by mol, preferably 85 to 100% by mol, based on 100% by mol of the diol units.

Examples of other diols which may be contained in amounts of not more than 20% by mol include:

aliphatic glycols, such as diethylene glycol, triethylene glycol, tetraethylene glycol, trimethylene glycol, propylene glycol, butanediol, pentanediol, neopentyl glycol, hexamethylene glycol and dodecamethylene glycol;

alicyclic glycols, such as cyclohexanedimethanol;

glycols containing aromatic groups, such as 1,3-bis(2-hydroxyethoxy)benzene, 1,2-bis(2-hydroxyethoxy)benzene, 1,4-(2-hydroxyethoxy)benzene and dihydroxyethoxyresorcinol; and aromatic diols, such as bisphenols, hydroquinone and 2,2-bis(4-β-hydroxyethoxyphenyl)propane.

Also employable are ester derivatives of these diols, and these diols or their ester derivatives can be used in combination of two or more kinds.

Of these diols, preferable are diethylene glycol and cyclohexanedimethanol.

The polyethylene terephthalate for use in the invention may further contain units derived from polycarboxylic acids having 3 or more carboxyl groups and polyhydric alcohols having 3 or more hydroxyl groups, within limits not prejudicial to the object of the invention. Examples of polycarboxylic acids are trimeric acid and pyromellitic anhydride, and examples of polyhydric alcohols are glycerol, 1,1,1-trimethylolethane, 1,1,1-trimethylolpropane, 1,1,1-trimethylolmethane and pentaerythritol.

The polyethylene terephthalate for use in the invention is substantially linear, and this can be confirmed by the fact that the polyethylene terephthalate is dissolved in o-chlorophenol.

The polyethylene terephthalate for use in the invention desirably has an intrinsic viscosity ($\eta$), as measured in o-chlorophenol at 25° C., of 0.3 to 0.8 dl/g, preferably 0.35 to 0.75 dl/g, and is a product obtained after liquid phase polymerization and before solid phase polymerization.

The polyethylene terephthalate desirably has a melting point, as measured by a differential scanning calorimeter (DSC, heating rate: 10° C./min), of usually 210 to 265° C., preferably 220 to 260° C., and has a glass transition temperature of usually 50 to 120° C., preferably 60 to 100° C.

The polyethylene terephthalate for use in the invention may be precrystallized, if necessary. The precrystallization can be carried out by heating the polyethylene terephthalate at a temperature of usually 130 to 200° C. for about 1 to 360 minutes.

The polyethylene terephthalate can be prepared by a conventional process. For example, the aforesaid dicarboxylic acid and diol are directly esterified and then melt polymerized in the presence of a polycondensation catalyst such as a germanium compound (e.g. germanium dioxide), an antimony compound (e.g., antimony trioxide, antimony acetate) or a titanium compound (e.g., titanium tetraalkoxide), or an ester of the dicarboxylic acid and the diol are subjected to transesterification in the presence of a transesterification catalyst and then melt polymerized in the presence of a polycondensation catalyst such as a germanium compound (e.g. germanium dioxide), an antimony compound (e.g., antimony trioxide, antimony acetate) or a titanium compound (e.g., titanium tetraalkoxide).

(B) Polyethylene Naphthalate

The polyethylene naphthalate (B) for use in the invention comprises dicarboxylic acid constituent units derived from naphthalenedicarboxylic acid and diol constituent units derived from ethylene glycol.

As the polyethylene naphthalate (B), particularly preferable is a polyethylene naphthalate copolymer comprising dicarboxylic acid constituent units derived from naphthalenedicarboxylic acid and isophthalic acid and diol constituent units derived from ethylene glycol and a polyalkylene glycol having an alkylene oxide chain of 2 to 10 carbon atoms.

It is desirable that the polyethylene naphthalate (B) contains naphthalenedicarboxylic acid units in amounts of 100 to 55% by weight, preferably 100 to 75% by weight, more preferably 99 to 80% by weight, based on the total amount of the dicarboxylic acid constituent units, and contains isophthalic acid constituent units in amounts of 0 to 45% by weight, preferably 0 to 25% by weight, more preferably 1 to 20% by weight, based on the total amount of the dicarboxylic acid constituent units.

The polyethylene naphthalate (B) having such composition of the dicarboxylic acid constituent units is particularly excellent in gas barrier properties and is also excellent in heat stability and moldability in the molding process.

The polyethylene naphthalate (B) for use in the invention may contain constituent units derived from dicarboxylic acids other than the 2,6-naphthalenedicarboxylic acid and the isophthalic acid in amounts of less than 15% by mol, within limits not prejudicial to the object of the invention.

Examples of other dicarboxylic acids which may be contained in amounts of less than 15% by mol include:

aromatic dicarboxylic acids, such as terephthalic acid, phthalic acid (orthophthalic acid), 2,7-naphthalenedicarboxylic acid, 2,5-naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid, decanedicarboxylic acid; and alicyclic dicarboxylic acids, such as cyclohexanedicarboxylic acid.

Also employable are ester derivatives of these dicarboxylic acids, and these dicarboxylic acids or their ester derivatives can be used in combination of two or more kinds.

Of these dicarboxylic acids, preferable is terephthalic acid.

It is desirable that the polyethylene naphthalate (B) contains ethylene glycol constituent units in amounts of 100 to 90% by weight, preferably 99.999 to 90% by weight, more preferably 99.99 to 92% by weight, still more preferably 99.9 to 94% by weight, particularly preferably 99.5 to 95% by weight, based on the total amount of the diol constituent units.

The polyethylene naphthalate (B) preferably contains polyalkylene glycol constituent units having an alkylene oxide chain of 2 to 10 carbon atoms. In this case, it is desirable that the polyalkylene glycol constituent units are contained in amounts of 0 to 10% by weight, preferably 0.001 to 10% by weight, more preferably 0.01 to 8% by weight, still more preferably 0.1 to 6% by weight, particularly preferably 0.5 to 5% by weight, based on the total amount of the diol constituent units.

When the content of the polyalkylene glycol constituent units is not less than 0.001% by weight, the gas barrier properties and the heat-up crystallizing rate of the polyethylene naphthalate (B) are satisfactory. When the content thereof is not more than 10% by weight, the polyethylene naphthalate has high transparency and shows excellent heat stability in the molding process.

The polyalkylene glycol having an alkylene oxide chain of 2 to 10 carbon atoms is a conventionally known polyalkylene glycol, and such a polyalkylene glycol can be prepared by cocondensing an alkylene glycol of 2 to 10 carbon atoms in accordance with a known method.

The polyalkylene glycol desirably has a degree of polymerization (n) of 5 to 50, preferably 10 to 45.

Examples of the polyalkylene glycols include polyethylene glycol, polypropylene glycol, polytetramethylene glycol, polyheptamethylene glycol, polyhexamethylene glycol and polyoctamethylene glycol. Of these, preferable are polypropylene glycol, polytetramethylene glycol, polyhexamethylene glycol and polyoctamethylene glycol, because they contribute to improvement of gas barrier properties. Particularly preferable is polytetramethylene glycol.

The polyethylene naphthalate (B) for use in the invention may further contain constituent units derived from diols other than the ethylene glycol and the polyalkylene glycol having an alkylene oxide chain of 2 to 10 carbon atoms in amounts of less than 15% by mol, within limits not prejudicial to the object of the invention.

Examples of other diols which may be contained in amounts of less than 15% by mol include such diols as previously exemplified with respect to the polyethylene terephthalate (A). Of such diols, preferable are diethylene glycol and 1,3-bis(2-hydroxyethoxy)benzene.

The polyethylene naphthalate (B) for use in the invention may further contain units derived from such polycarboxylic acids having 3 or more carboxyl groups and such polyhydric alcohols having 3 or more hydroxyl groups as previously described with respect to the polyethylene terephthalate (A). Specifically, the units derived from the polyfunctional carboxylic acid and/or the units derived from the polyhydric alcohol may be contained independently in amounts of 0.05 to 0.4% by mol, preferably 0.1 to 0.35% by mol, more preferably 0.2 to 0.35% by mol, based on 100% by mol of the dicarboxylic acid units.

The polyethylene naphthalate (B) for use in the invention desirably has an intrinsic viscosity (1), as measured in o-chlorophenol at 2° C., of 0.3 to 0.7 dl/g, preferably 0.35 to 0.65 dl/g. The polyethylene naphthalate (B) desirably has a melting point, as measured by a differential scanning calorimeter (DSC, heating rate: 10° C./min), of usually 220 to 280° C., preferably 230 to 275° C., and has a glass transition temperature of usually 90 to 140° C., preferably 100 to 130° C.

The polyethylene naphthalate (B) may be precrystallized, if necessary. The precrystallization can be carried out by heating the polyethylene naphthalate at a temperature of usually 160 to 230° C. for about 1 to 360 minutes.

The polyethylene naphthalate (B) for use in the invention can be prepared by a conventional process. For example, the aforesaid dicarboxylic acid and diol are directly esterified and then melt polymerized in the presence of a polycondensation catalyst such as a germanium compound (e.g. germanium dioxide), an antimony compound (e.g., antimony trioxide, antimony acetate) or a titanium compound (e.g., titanium tetraalkoxide), or an ester of the dicarboxylic acid and the diol are subjected to transesterification in the presence of a transesterification catalyst and then melt polymerized in the presence of a polycondensation catalyst such as a germanium compound (e.g. germanium dioxide), an antimony compound (e.g., antimony trioxide, antimony acetate) or a titanium compound (e.g., titanium tetraalkoxide).

Blending of Polyesters

In the present invention, 99 to 40% by weight, preferably 98 to 50% by weight, of the polyethylene terephthalate (A) and 60 to 1% by weight, preferably 50 to 2% by weight, of the polyethylene naphthalate (B) are blended with each other.

The blending can be carried out by mixing the polyethylene terephthalate (A) with the polyethylene naphthalate (B) in the above mixing ratio and melt kneading the mixture at 260 to 330° C. for 30 to 300 seconds. After the kneading, the resulting blend is processed into chips by means of an extruder or the like. The average diameter of the chips is preferably in the range of 2.0 to 5.0 mm.

In the blending of the polyethylene terephthalate (A) with the polyethylene naphthalate (B), a transesterification catalyst and a lubricant may be optionally added.

Examples of the transesterification catalysts include germanium dioxide, antimony trioxide, antimony acetate and titanium tetrabutoxide. The transesterification catalyst is desirably used in an amount of 0.0005 to 0.1 part by weight, preferably 0.001 to 0.05 part by weight, based on 100 parts by weight of the blend.

Examples of the lubricants include magnesium stearate and calcium stearate. The lubricant is desirably used in an amount of 0.0005 to 0.1 part by weight, preferably 0.001 to 0.05 part by weight, based on 100 parts by weight of the blend.

It is desirable that the blend thus obtained has a heat-up crystallizing temperature (Tcc) of not higher than 190° C., preferably not higher than 180° C., more preferably 120 to 170° C.

The heat-up crystallizing temperature (Tcc) is determined using a differential scanning calorimeter of DSC-7 model manufactured by Perkin Elmer Co. in the following manner.

A sample of about 10 mg is collected from the center of the chip of the polyester blend which has been dried under a pressure of about 5 mmHg at about 140° C. for at least about 5 hours. The sample is introduced into an aluminum pan for liquids of the DSC in a nitrogen atmosphere, and the pan is closed. The sample is first rapidly heated from room temperature at a heating rate of 320° C./min, maintained at 290° C. for 10 minutes under melting, rapidly cooled to room temperature at a cooling rate of 320° C./min, maintained at room temperature for 10 minutes and finally heated at a heating rate of 10° C./min, to detect exothermic peaks, and the temperature at the maximum peak is found.

The blend desirably has an intrinsic viscosity (q), as measured in o-chlorophenol at 25° C., of 0.3 to 0.9 dl/g, preferably 0.35 to 0.85 dl/g.

Solid Phase Polymerization of Blend

The chips of the blend obtained as above are then subjected to solid phase polymerization.

The solid phase polymerization is generally carried out by heating the chips of the blend at a temperature of 180 to 230° C., preferably 190 to 220° C.

It is desirable that the chips of the blend are in a dry state when subjected to the solid phase polymerization. Therefore, the chips of the blend may be beforehand dried at a temperature of 80 to 180° C. In the present invention, the blend may also be precrystallized prior to the solid phase polymerization. Precrystallization of the blend is carried out by heating the blend at a temperature of 120 to 200° C., preferably 140 to 180° C.

The polyester obtained as above has an intrinsic viscosity (η), as measured in o-chlorophenol at 25° C., of 0.5 to 1.5 dl/g, preferably 0.6 to 1.2 dl/g. It is desirable that the intrinsic viscosity of the polyester is about 1.1 to 2.5 times, preferably 1.2 to 2.0 times, greater than the intrinsic viscosity of the blend before the solid phase polymerization.

In the present invention, the resulting solid phase polymerization product may be subjected to a hot water treatment. The hot water treatment can be carried out by immersing the solid phase polymerization product in hot water of 70 to 120° C. for 1 to 360 minutes.

The polyester obtained by the process of the invention may optionally contain additives commonly added to polyesters, such as colorants, antioxidants, ultraviolet light absorbers, antistatic agents and flame retardants.

The polyester prepared by the process of the invention can be used as a material of various molded products such as preforms, bottles, (oriented) films and sheets. The bottles produced from the polyester composition are excellent in gas barrier properties, transparency and heat resistance. Moreover, the bottles hardly generate acetaldehyde, so that the taste of the contents such as juice does not deteriorate.

EFFECT OF THE INVENTION

According to the invention, a polyester having excellent gas barrier properties, transparency and heat resistance and hardly generating acetaldehyde can be obtained.

EXAMPLE

The present invention is further described with reference to the following examples, but it should be construed that the invention is in no way limited to those examples.

In the following examples, properties were evaluated by the methods described below.

Intrinsic Viscosity

A sample was dissolved in an o-chlorophenol solvent to prepare a sample solution having a concentration of 1 g/dl, and the solution viscosity of the solution was measured at 25° C. by means of an Ubbelohde capillary viscometer. Then, o-chlorophenol was slowly added to the solution to measure solution viscosities on the low concentration side. From the obtained data, the viscosity at the concentration of 0% was extrapolated.

Carbon Dioxide Gas Permeability Constant (Gas Barrier Properties)

The carbon dioxide gas permeability constant was measured by means of a gas permeability measuring apparatus GPM-250 manufactured by G.L. Science Co. under the conditions of a temperature of 23° C. and a relative humidity of 60%.

The film for use in the measurements was prepared in the following manner.

Oriented Film

A film having a thickness of 0.3 mm was prepared by a press molding machine (mold temperature: 290° C.), and the film was rapidly cooled under the conditions of a cooling mold temperature of 0° C. to give an amorphous film. Then, the amorphous film was subjected to simultaneous biaxial orientation (3×3 times) at a temperature higher by 15° C. than the glass transition temperature (Tg) to obtain an oriented film.

Transparency (Haze)

A dry polymer was molded into a square plate having a thickness of 5 mm by means of an injection molding machine (cylinder temperature: 280° C.) under the conditions of a mold temperature of 10° C., and the transparency of the square plate was evaluated by measuring a haze (irregular reflectance of white light).

Acetaldehyde Content

From the molded product, a sample of about 2 g was collected, and the sample was freeze crushed by means of a freeze crusher (manufactured by SPEX Co.) to obtain a powdered sample. Then, 1 g of the powdered sample was introduced into a vial, and 2 ml of distilled water was added thereto, followed by sufficiently mixing them. After the vial was capped, it was heated at 120° C. for 1 hour. Then, the vial was cooled in ice water, and 5 µl of the supernatant was measured on the acetaldehyde content by a gas chromatography (GC-6A manufactured by Shimazu Seisakusho K.K).

Determination of $L_{NET}$

The measurement is carried out using a FT-NMR measuring machine (manufactured by Nippon Electronics Co., NMRJMN-GX270 model) for a solution of the resulting polyester dissolved in deuterochloroform.

There are depicted on the chart (1) a peak based on constituent units having a sequence of terephthalic acid (or isophthalic acid)-ethylene glycol-terephthalic acid (or isophthalic acid), (2) a peak based on constituent units having a sequence of naphthalenedicarboxylic acid-ethylene glycol-naphthalenedicarboxylic acid, and (3) a peak based on constituent units having a sequence of naphthalenedicarboxylic acid-ethylene glycol-terephthalic acid. Each of peak areas are measured and the amount of constituent units having a sequence of naphthalenedicarboxylic acid-ethylene glycol-terephthalic acid ($L_{NET}$ (% by mol)) is calculated as a ratio between these peak areas.

Melting Point

The melting point was measured using a differential scanning calorimeter of DSC-7 model manufactured by Perkin Elmer Co. A sample of about 10 mg is collected from the center of the chip of the polyester which has been dried under a pressure of about 5 mmHg at about 140° C. for at least about 5 hours. The sample is introduced into an aluminum pan for liquids of the DSC in a nitrogen atmosphere, and the pan is closed.

The sample was first rapidly heated from room temperature at a heating rate of 320° C./min, maintained at 290° C. for 10 minutes under melting, thereafter rapidly cooled to room temperature at a cooling rate of 320° C./min, maintained at room temperature for 10 minutes and finally heated at a heating rate of 10° C./min, to detect endothermic peaks, and the temperature at the maximum peak is found as the melting point.

Example 1

Polyethylene Terephthalate (A-1)

A slurry consisting of 332 g of high-purity terephthalic acid and 143 g of ethylene glycol was prepared. To the slurry, 0.042 g of germanium dioxide and 0.080 g of phosphoric acid were added. The resulting slurry was heated to a temperature of 255° C. under a pressure (absolute pressure: 1.7 kg/cm$^2$) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of polyethylene terephthalate (A-1) having an intrinsic viscosity of 0.615 dl/g. The prepolymer was extruded from a nozzle to give a strand, and the strand was cut into column-like chips having a diameter of 2.5 mm and a height of 3.5 mm. The prepolymer had a heat-up crystallizing temperature of 158° C.

Polyethylene Naphthalate Copolymer (B-1)

A slurry consisting of 228 g of 2,6-dimethyl naphthalate, 19 g of dimethyl isophthalate, 143 g of ethylene glycol and 1.9 g of polytetramethylene glycol having an average molecular weight of 1,000 was prepared. The slurry and 0.25 g of manganese acetate tetrahydrate were introduced into a reactor, and they were reacted in a nitrogen atmosphere at 240° C. for 3 hours at atmospheric pressure with stirring. Then, the reaction was further conducted at a temperature of 260° C. for 3 hours to prepare a low molecular weight polymer. The methanol produced by the reaction was continually distilled off from the reaction system. To the reaction mixture, 0.042 g of germanium dioxide and 0.080 g of phosphoric acid were added, and melt polymerization of the low molecular weight polymer was conducted at a temperature of 285° C. under a reduced pressure of 1 Torr to produce a prepolymer of a polyethylene naphthalate copolymer (B-1) having an intrinsic viscosity of 0.643 dl/g. The prepolymer was extruded from a nozzle to give a strand, and the strand was cut into column-like chips having a diameter of 2.5 mm and a height of 3.5 mm.

Blending of Polyesters

A dry blend of 90 parts by weight of the prepolymer of the polyethylene terephthalate (A-1) and 10 parts by weight of the prepolymer of the polyethylene naphthalate copolymer (B-1) was melt kneaded at a molding temperature of 295° C. by means of a single-screw extruder (diameter: 20 mm, manufactured by Thermo Co.) for a residence time in the cylinder of 120 seconds. The kneadate was extruded from a nozzle to give a strand, and the strand was cut into column-like chips having a diameter of 2.5 mm and a height of 3.5 mm. The prepolymer blend had a heat-up crystallizing temperature of 150° C.

Solid Phase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.835 dl/g. The oriented film produced from the polyester composition had a carbon dioxide gas permeability constant of 9.1 cc·mm/m²·day·atm, a haze of 9.8%, an amount of constituent units having a sequence of naphthalenedicarboxylic acid-ethylene glycol-terephthalic acid ($L_{NET}$) of 9.2% by mol and an acetaldehyde content of 11 ppm.

Example 2

Polyethylene Naphthalate Copolymer (B-2)

A slurry consisting of 228 g of 2,6-dimethyl naphthalate, 19 g of dimethyl isophthalate, 143 g of ethylene glycol and 1.9 g of polytetramethylene glycol having an average molecular weight of 1,000 was prepared. The resulting slurry and 0.25 g of manganese acetate tetrahydrate were introduced into a reactor and the reaction is conducted in a nitrogen atmosphere under atmospheric pressure at 240° C. for 3 hours with stirring, whereby a low molecular weight polymer was prepared. Methanol produced by the reaction was continuously distilled off from the reaction system. To the reaction mixture, 0.042 g of germanium dioxide and 0.080 g of phosphoric acid were added, and the low molecular weight polymer was melt polymerized at a temperature of 280° C. under a reduced pressure of 1 Torr to produce a prepolymer of a polyethylene naphthalate copolymer (B-2) having an intrinsic viscosity of 0.623 dl/g. The prepolymer was extruded from a nozzle to give a strand, and the strand was cut into column-like chips having a diameter of 2.5 mm and a height of 3.5 mm.

Blending of Polyesters

A dry blend of 60 parts by weight of the prepolymer of the polyethylene terephthalate (A-1) prepared in Example 1 and 40 parts by weight of the prepolymer of the polyethylene naphthalate copolymer (B-2) was melt kneaded at a molding temperature of 295° C. by means of a single-screw extruder (diameter: 20 mm, manufactured by Thermo Co.) for a residence time in the cylinder of 120 seconds. The kneadate was extruded from a nozzle to give a strand, and the strand was cut into column-like chips having a diameter of 2.5 mm and a height of 3.5 mm. The prepolymer blend had a heat-up crystallizing temperature of 158° C.

Solid Phase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.842 dl/g. The oriented film produced from the polyester had a carbon dioxide gas permeability constant of 5.8 cc·mm/m²·day·atm, a haze of 9.2%, an amount of constituent units having a sequence of naphthalenedicarboxylic acid-ethylene glycol-terephthalic acid ($L_{NET}$) of 26.8% by mol and an acetaldehyde content of 13 ppm.

Example 3

Polyethylene Terephthalate (A-2)

A slurry consisting of 388 g of dimethyl terephthalate and 136 g of ethylene glycol was prepared. To the slurry, 0.049 g of manganese acetate tetrahydrate was added, and the mixture was heated to 180° C. at atmospheric pressure to perform reaction until the degree of transesterification became 95%, whereby a low molecular weight polymer was prepared. To the reaction mixture, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of polyethylene terephthalate (A-2) having an intrinsic viscosity of 0.598 dl/g. The prepolymer was extruded from a nozzle to give a strand, and the strand was cut into column-like chips having a diameter of 2.5 mm and a height of 3.5 mm. The prepolymer had a heat-up crystallizing temperature of 153° C.

Polyethylene Naphthalate Copolymer (B-3)

A slurry consisting of 228 g of 2,6-dimethyl naphthalate, 19 g of dimethyl isophthalate, 143 g of ethylene glycol and 1.9 g of polytetramethylene glycol having an average molecular weight of 2,000 was prepared. To the slurry, 0.49 g of manganese acetate tetrahydrate was added, and the mixture was heated to 180° C. at atmospheric pressure to perform reaction until the degree of transesterification became 95%, whereby a low molecular weight polymer was prepared. To the reaction mixture, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of a polyethylene naphthalate copolymer (B-3) having an intrinsic viscosity of 0.598 dl/g. The prepolymer was extruded from a nozzle to give a strand, and the strand was cut into column-like chips having a diameter of 2.5 mm and a height of 3.5 mm.

Blending of Polyesters

A dry blend of 90 parts by weight of the prepolymer of the polyethylene terephthalate (A-2) and 10 parts by weight of the prepolymer of the polyethylene naphthalate copolymer (B-3) was melt kneaded at a molding temperature of 295° C. by means of a single-screw extruder (diameter: 20 mm, manufactured by Thermo Co.) for a residence time in the cylinder of 90 seconds. The kneadate was extruded from a nozzle to give a strand, and the strand was cut into column-like chips having a diameter of 2.5 mm and a height of 3.5 mm. The prepolymer blend had a temperature rise crystallizing temperature of 156° C.

Solid Chase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.826 dl/g. The oriented film produced from the polyester had a carbon dioxide gas permeability constant of 10.1 cc·mm/m$^2$·day·atm, a haze of 8.6%, an amount of constituent units having a sequence of naphthalenedicarboxylic acid-ethylene glycol-terephthalic acid ($L_{NET}$) of 7.8% by mol and an acetaldehyde content of 10 ppm.

Example 4

Polyethylene Naphthalate Copolymer (B-4)

A slurry consisting of 186 g of 2,6-dimethyl naphthalate, 38 g of dimethyl isophthalate, 143 g of ethylene glycol and 1.9 g of polytetramethylene glycol having an average molecular weight of 1,000 was prepared. To the slurry, 0.49 g of manganese acetate tetrahydrate was added, and the mixture was heated to 180° C. at atmospheric pressure to perform reaction until the degree of transesterification became 95%, whereby a low molecular weight polymer was prepared. To the reaction mixture, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of a polyethylene naphthalate copolymer (B-4) having an intrinsic viscosity of 0.630 dl/g. The prepolymer was extruded from a nozzle to give a strand, and the strand was cut into column-like chips having a diameter of 2.5 mm and a height of 3.5 mm.

Blending of Polyesters

A dry blend of 90 parts by weight of the prepolymer of the polyethylene terephthalate (A-1) obtained in Example 1 and 10 parts by weight of the prepolymer of the polyethylene naphthalate copolymer (B-4) was melt kneaded at a molding temperature of 285° C. by means of a single-screw extruder (diameter: 20 mm, manufactured by Thermo Co.) for a residence time in the cylinder of 120 seconds. The kneadate was extruded from a nozzle to give a strand, and the strand was cut into column-like chips having a diameter of 2.5 mm and a height of 3.5 mm. The prepolymer blend had a heat-up crystallizing temperature of 148° C.

Solid Chase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.842 dl/g. The oriented film produced from the polyester had a carbon dioxide gas permeability constant of 9.8 cc·mm/m$^2$·day·atm, a haze of 6.8%, an amount of constituent units having a sequence of naphthalenedicarboxylic acid-ethylene glycol-terephthalic acid ($L_{NET}$) of 8.5% by mol and an acetaldehyde content of 11 ppm.

Example 5

Polyethylene Naphthalate (B-5)

A slurry consisting of 250 g of 2,6-dimethyl naphthalate and 142 g of ethylene glycol was prepared. To the slurry, 0.49 g of manganese acetate tetrahydrate was added, and the mixture was heated to 180° C. at atmospheric pressure to perform reaction until the degree of transesterification became 95%, whereby a low molecular weight polymer was prepared. To the reaction mixture, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of polyethylene naphthalate (B-5) having an intrinsic viscosity of 0.625 dl/g. The prepolymer was extruded from a nozzle to give a strand, and the strand was cut into column-like chips having a diameter of 2.5 mm and a height of 3.5 mm.

Blending of Polyesters

A dry blend of 90 parts by weight of the prepolymer of the polyethylene terephthalate (A-1) obtained in Example 1 and 10 parts by weight of the prepolymer of the polyethylene naphthalate (B-5) was melt kneaded at a molding temperature of 295° C. by means of a single-screw extruder (diameter: 20 mm, manufactured by Thermo Co.) for a residence time in the cylinder of 120 seconds. The kneadate was extruded from a nozzle to give a strand, and the strand was cut into column-like chips having a diameter of 2.5 mm and a height of 3.5 mm. The prepolymer blend had a heat-up crystallizing temperature of 156° C.

Solid Phase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.841 dl/g. The oriented film produced from the polyester had a carbon dioxide gas permeability constant of 14.5 cc·mm/m$^2$·day·atm, a haze of 17.8%, an amount of constituent units having a sequence of naphthalenedicarboxylic acid-ethylene glycol-terephthalic acid ($L_{NET}$) of 6.1% by mol and an acetaldehyde content of 16 ppm.

Comparative Example 1

The prepolymer of the polyethylene terephthalate (A-1) obtained in Example 1 was melt kneaded at a molding temperature of 275° C. by means of a single-screw extruder (diameter: 20 mm, manufactured by Thermo Co.). The kneadate was extruded from a nozzle to give a strand, and the strand was cut into column-like chips having a diameter of 2.5 mm and a height of 3.5 mm. The prepolymer had a heat-up crystallizing temperature of 142° C.

Solid Phase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.830 dl/g. The oriented film produced from the polyester had a carbon dioxide gas permeability constant of 16.8 cc·mm/m$^2$·day·atm, a haze of 7.2%, an amount of constituent units having a sequence of naphthalenedicarboxylic acid-ethylene glycol-terephthalic acid ($L_{NET}$) of 0% by mol and an acetaldehyde content of 14 ppm.

Comparative Example 2

Solid Phase Polymerization Product of Polyethylene Terephthalate (A-1)

A slurry consisting of 332 g of high-purity terephthalic acid and 143 g of ethylene glycol was prepared. To the slurry, 0.042 g of germanium dioxide and 0.080 g of phosphoric acid were added. The resulting slurry was heated to a temperature of 255° C. under a pressure (absolute pressure: 1.7 kg/cm$^2$) to perform esterification reaction until the degree of esterification became 95%, whereby a low molecular weight polymer was prepared. The low molecular weight polymer was melt polymerized at a temperature of 280° C. under a reduced pressure of 1 Torr to produce a prepolymer of polyethylene terephthalate (A-1) having an intrinsic viscosity of 0.615 dl/g. The prepolymer was extruded from a nozzle to give a strand, and the strand was cut into column-like chips having a diameter of 2.5 mm and a height of 3.5 mm. The prepolymer had a heat-up crystallizing temperature of 158° C. Then, the chips were precrystallized at 170° C. for 2 hours in a stream of nitrogen and then subjected to solid phase polymerization at 210° C. for 16 hours in a nitrogen atmosphere. The resulting polyester had an intrinsic viscosity of 0.835 dl/g.

Polyethylene Naphthalate Copolymer (B-6) A slurry consisting of 228 g of 2,6-dimethyl naphthalate, 19 g of dimethyl isophthalate, 143 g of ethylene glycol and 1.9 g of polytetramethylene glycol having an average molecular weight of 1,000 was prepared. The slurry and 0.25 g of manganese acetate tetrahydrate were introduced into a reactor, and they were reacted in a nitrogen atmosphere at 240° C. for 3 hours at atmospheric pressure with stirring. Then, the reaction was further conducted at a heating temperature of 260° C. for 3 hours to prepare a low molecular weight polymer. The methanol produced by the reaction was continually distilled off from the reaction system. To the reaction mixture, 0.042 g of germanium dioxide and 0.080 g of phosphoric acid were added, and melt polymerization of the low molecular weight polymer was conducted at a temperature of 285° C. under a reduced pressure of 1 Torr to produce a prepolymer of a polyethylene naphthalate copolymer (B-6) having an intrinsic viscosity of 0.815 dl/g. The prepolymer was extruded from a nozzle to give a strand, and the strand was cut into column-like chips having a diameter of 2.5 mm and a height of 3.5 mm.

Blending of Polyesters

A dry blend of 90 parts by weight of the solid phase polymerization product of the polyethylene terephthalate (A-1) and 10 parts by weight of the prepolymer of the polyethylene naphthalate copolymer (B-6) was melt kneaded at a molding temperature of 295° C. by means of a single-screw extruder (diameter: 20 mm, manufactured by Thermo Co.) for a residence time in the cylinder of 240 seconds. The kneadate was extruded from a nozzle to give a strand, and the strand was cut into column-like chips having a diameter of 2.5 mm and a height of 3.5 mm. The polyester had a heat-up crystallizing temperature of 156° C. The intrinsic viscosity of the polyester was 0.820 dl/g. The oriented film produced from the polyester had a carbon dioxide gas permeability constant of 13.8 cc·mm/m$^2$·day·atm, a haze of 15.3%, an amount of constituent units having a sequence of naphthalenedicarboxylic acid-ethylene glycol-terephthalic acid ($L_{NET}$) of 3.5% by mol and an acetaldehyde content of 19 ppm.

Comparative Example 3

Polyethylene Terephthalate (A-3)

A slurry consisting of 175 g of dimethyl terephthalate, 23 g of 2,6-dimethyl naphthalate, 2 g of dimethyl isophthalate, 143 g of ethylene glycol and 0.2 g of polytetramethylene glycol having an average molecular weight of 1,000 was prepared. The slurry and 0.25 g of manganese acetate tetrahydrate were introduced into a reactor, and they were reacted in a nitrogen atmosphere at 180° C. for 3 hours at atmospheric pressure with stirring. Then, the reaction was further conducted at a heating temperature of 200° C. for 3 hours to prepare a low molecular weight polymer. The methanol produced by the reaction was continually distilled off from the reaction system.

To the low molecular weight polymer, 0.042 g of germanium dioxide and 0.080 g of phosphoric acid were added, and melt polymerization of the low molecular weight polymer was conducted at a temperature of 285° C. under a reduced pressure of 1 Torr to produce a prepolymer of polyethylene terephthalate (A-3) having an intrinsic viscosity of 0.628 dl/g. The prepolymer was extruded from a nozzle to give a strand, and the strand was cut into column-like chips having a diameter of 2.5 mm and a height of 3.5 mm. The prepolymer had a heat-up crystallizing temperature of 165° C.

Solid Phase Polymerization

The chips obtained above were heated at 170° C. for 2 hours in a stream of nitrogen to precrystallize them and then further heated at 210° C. for 16 hours to perform solid phase polymerization.

The resulting polyester had an intrinsic viscosity of 0.843 dl/g. The oriented film produced from the polyester had a carbon dioxide gas permeability constant of 14.5 cc·mm/m$^2$·day-atm, a haze of 7.1%, an amount of constituent units having a sequence of naphthalenedicarboxylic acid-ethylene glycol-terephthalic acid ($L_{NET}$) of 16.8% by mol and an acetaldehyde content of 13 ppm.

TABLE 1

| | Polyethylene terephthalate prepolymer (parts by weight) | Polyethylene naphthalate prepolymer (parts by weight) | $m_I$ | $m_N$ | Solid phase polymerization after blending | Intrinsic viscosity (dl/g) |
|---|---|---|---|---|---|---|
| Ex. 1 | A-1: 90 | B-1: 10 | 1 | 9 | done | 0.835 |
| Ex. 2 | A-1: 60 | B-2: 40 | 4 | 36 | done | 0.842 |
| Ex. 3 | A-2: 90 | B-3: 10 | 1 | 9 | done | 0.826 |
| Ex. 4 | A-1: 90 | B-4: 10 | 1 | 9 | done | 0.842 |
| Ex. 5 | A-1: 90 | B-5: 10 | 0 | 10 | done | 0.841 |
| Comp. Ex. 1 | A-1: 100 | | | | —*$^2$ | 0.830 |
| Comp. Ex. 2 | Solid phase polymerization product A-1: 90 | B-6: 10 | 1 | 9 | not done | 0.820*$^1$ |
| Comp. Ex. 3 | A-3: 100 | | 1 | 9 | —*$^2$ | 0.843 |

| | CO$_2$ gas permeability constant (*$^3$) | Haze (%) | $L_{NET}$ | CH$_3$CHO content (ppm) | $[1/527 - 0.0017 \cdot \ln(1 - (m_I + m_N)/200]^{-1} - 273$ (° C.) | Tm (° C.) |
|---|---|---|---|---|---|---|
| Ex. 1 | 9.1 | 9.8 | 9.2 | 11 | 231 | 245 |
| Ex. 2 | 5.8 | 9.2 | 26.8 | 13 | 166 | 230 |
| Ex. 3 | 10.1 | 8.6 | 7.8 | 10 | 231 | 245 |
| Ex. 4 | 9.8 | 6.8 | 8.5 | 11 | 231 | 246 |

TABLE 1-continued

| | | | | | | |
|---|---|---|---|---|---|---|
| Ex. 5 | 14.5 | 17.8 | 6.1 | 16 | 231 | 248 |
| Comp. Ex. 1 | 16.8 | 7.2 | 0 | 14 | 254 | 254 |
| Comp. Ex. 2 | 13.8 | 15.3 | 3.5 | 19 | 231 | 251 |
| Comp. Ex. 3 | 14.5 | 7.1 | 16.8 | 13 | 231 | 231 |

*[1]The intrinsic viscosity in Comp. Ex. 2 is an intrinsic viscosity of a blend because the polyethylene terephthalate (A-1) after solid phase polymerization was used in Comp. Ex. 2.
*[2]In Comp. Ex. 1, the prepolymer of the polyethylene terephthalate (A-1) was subjected to solid phase polymerization after melt kneading, and in Comp. Ex. 3, the prepolymer of the polyethylene terephyhalate (A-3) was subjected to solid phase polymerization.
*[3]The carbon dioxide gas permeability constant is expressed in cc.mm/m$^2$.day.atm.

What is claimed is:

1. A polyester which comprises dicarboxylic acid constituent units derived from terephthalic acid and naphthalenedicarboxylic acid and diol constituent units derived from ethylene glycol, and which has the following properties:
    constituent units derived from terephthalic acid are 40 to 99.5% by weight, constituent units derived from naphthalenedicarboxylic acid are 0.5 to 60% by weight and constituent units derived from isophthalic acid are 0 to 25% by weight, all based on the total amount of dicarboxylic acid constituent units (i),
    constituent units derived from ethylene glycol are 95 to 99.999% by weight and constituent units derived from a polyalkylene glycol having an alkylene oxide chain of 2 to 10 carbon atoms, wherein the degree of polymerization (n) of the polyalkylene glycol is in the range of 5 to 50, are 0.001 to 5% by weight, both based on the total amount of diol constituent units (ii),
    the intrinsic viscosity is in the range of 0.5 to 1.5 dl/g,
    the melting point (Tm (° C.)), as measured by a differential scanning calorimeter, satisfies the following formula (I):

$$\{1/527-0.0017\times\ln(1-(m_I+m_N)/200)\}^{-1}-273<Tm<254 \quad (I)$$

wherein $m_I$ is a proportion (% by mol) of the constituent units derived from isophthalic acid to all of the dicarboxylic acid constituent units, and $m_N$ is a proportion (% by mol) of the constituent units derived from naphthalenedicarboxylic acid to all of the dicarboxylic acid constituent units, and
    the amount of constituent units having a sequence of naphthalene acid-ethylene glycol-terephthalic acid ($L_{NET}$ (% by mol), as measured by $^1$H-NMR, satisfies the following formula (II):

$$L_{NET}\leq 0.5\times m_N \quad (II)$$

wherein $m_N$ is a proportion (% by mol) of the constituent units derived from naphthalenedicarboxylic acid to all of the dicarboxylic acid constituent units.

2. The polyester as claimed in claim 1, wherein the melting point (Tm (° C.)) satisfies the following formula (I'):

$$[1/527-0.0017\cdot\ln(1-(m_I+m_N)/200)]^{-1}-270<Tm\leq 254 \quad (I').$$

3. The polyester as claimed in claim 1, wherein the polyalkylene glycol is polytetramethylene glycol.

4. The polyester as claimed in claim 1, wherein the polyester has a haze value, as measured for a 5 mm-thick square plate obtained by injection molding at an injection molding temperature of 280° C. and a mold temperature of 10° C., of not more than 20%.

5. The polyester as claimed in claim 1, wherein the polyester has an acetaldehyde content of not more than 20 pm.

6. The process for preparing a polyester as claimed in claim 4, wherein the degree of polymerization (n) of the polyalkylene glycol is in the range of 5 to 50.

7. The process for preparing a polyester as claimed in claim 4, wherein the polyalkylene glycol is polytetramethylene glycol.

8. The process for preparing a polyester as claimed in claim 3, wherein the blend is heated to precrystallize it prior to the solid phase polymerization.

9. The process for preparing a polyester as claimed in claim 3, wherein the blend to be subjected to the solid phase polymerization has a heat-up crystallizing temperature of not higher than 190° C.

10. A process for preparing a polyester, which comprises:
    blending (A) polyethylene terephthalate having, before solid phase polymerization, an intrinsic viscosity of 0.3 to 0.8 dl/g, in an amount of 99 to 40% by weight, with
    (B) polyethylene naphthalate having, before solid phase polymerization, an intrinsic viscosity of 0.3 to 0.7 dl/g, in an amount of 1 to 60% by weight,
    wherein the polyethylene naphthalate (B) comprises
        (i) dicarboxylic acid constituent units comprising 100 to 55% by weight of naphthalene dicarboxylic acid constituent units and 0 to 40% by weight of isophthalic acid constituent units, and
        (ii) diol constituent units comprising 99.999 to 90% by weight of ethylene glycol constituent units and 0.001 to 10% by weight of polyalkylene glycol constituent units having an alkylene oxide chain of 2 to 10 carbon atoms, wherein the degree of polymerization (n) of the polyalkylene glycol is in the range of from 5 to 50, and
    subjecting the blend to solid phase polymerization.

11. The process for preparing a polyester as claimed in claim 10, wherein the polyalkylene glycol is polytetramethylene glycol.

12. The process of claim 10, wherein the diol constituent units (ii) comprise 99.5 to 99.9% by weight of ethylene glycol constituent units and 0.5 to 5% by weight of said polyalkylene glycol constituent units.

13. The process for preparing a polyester as claimed in claim 3, wherein the polyalkylene glycol is polytetramethylene glycol.

14. A polyester prepared by blending
    (A) polyethylene terephthalate having, before solid phase polymerization, an intrinsic viscosity of 0.3 to 0.8 dl/g, in an amount of 99 to 40% by weight, with
    (B) polyethylene naphthalate having, before solid phase polymerization, an intrinsic viscosity of 0.3 to 0.7 dl/g, in an amount of 1 to 60% by weight,
    wherein the polyethylene naphthalate (B) comprises
        (iii) dicarboxylic acid constituent units comprising 100 to 55% by weight of naphthalene dicarboxylic acid constituent units and 0 to 40% by weight of isophthalic acid constituent units, and
        (iv) diol constituent units comprising 99.999 to 90% by weight of ethylene glycol constituent units and 0.001 to 10% by weight of polyalkylene glycol constituent units having an alkylene oxide chain of 2 to 10 carbon atoms, wherein the degree of polymerization (n) of the polyalkylene glycol is in the range of from 5 to 50, and
    subjecting the blend to solid phase polymerization.

15. The polyester as claimed in claim 14, wherein the polyalkylene glycol is polytetramethylene glycol.

16. The polyester as claimed in claim 14, wherein the diol constituent units comprise 99.5 to 95% by weight of ethylene glycol constituent units and 0.5 to 5% by weight of polyalkylene glycol constituent units having an alkylene oxide chain of 2 to 10 carbon atoms.

17. The polyester as claimed in claim 16, wherein the polyalkylene glycol is polytetramethylene glycol.

18. The polyester as claimed in claim 5, wherein the polyester has a $CO_2$ gas permeability constant of less than 13.8 cc·mm/m²·day·atm.

19. The polyester as claimed in claim 1, wherein the constituent units derived from isophthalic acid are present in an amount of 0.5 to 20% by weight.

20. The polyester as claimed in claim 14, wherein the constituent units derived from isophthalic acid are present in an amount of 0.5 to 20% by weight.

21. The process as claimed in claim 10, wherein the dicarboxylic acid constituent units comprise from 0.5 to 20% by weight of constituent units derived from isophthalic acid.

* * * * *

UNITED STATES PATENT AND TRADEMARK OFFICE
CERTIFICATE OF CORRECTION

PATENT NO. : 6,355,738 B2
DATED : March 12, 2002
INVENTOR(S) : Koji Nakamachi

It is certified that error appears in the above-identified patent and that said Letters Patent is hereby corrected as shown below:

Column 19,
Line 48, delete "naphthalene", insert -- naphthalenedicarboxylic --
Line 52, formula (II), delete "≦", insert -- ≧ --.

Column 20,
Line 27, delete "40%", insert -- 45% --.
Line 41, delete "99.9%", insert -- 95% --.
Line 45, delete "3", insert -- 12 --.
Line 57, delete "40%", insert -- 45% --.

Signed and Sealed this

Seventeenth Day of December, 2002

JAMES E. ROGAN
*Director of the United States Patent and Trademark Office*